United States Patent
DiPaolo

(10) Patent No.: US 8,442,855 B2
(45) Date of Patent: May 14, 2013

(54) METHOD OF DESIGNING AND BUILDING TO A TARGETED COST FOR HIGH TECH FACILITIES

(76) Inventor: Christopher R. DiPaolo, Conshohocken, PA (US)

(*) Notice: Subject to any disclaimer, the term of this patent is extended or adjusted under 35 U.S.C. 154(b) by 425 days.

(21) Appl. No.: 12/383,483

(22) Filed: Mar. 25, 2009

(65) Prior Publication Data

US 2009/0259601 A1    Oct. 15, 2009

Related U.S. Application Data

(60) Provisional application No. 61/072,149, filed on Mar. 28, 2008.

(51) Int. Cl.
*G06Q 10/00* (2012.01)

(52) U.S. Cl.
USPC .......................................................... 705/7.35

(58) Field of Classification Search .................. 705/7.35
See application file for complete search history.

(56) References Cited

U.S. PATENT DOCUMENTS

| | | | |
|---|---|---|---|
| 5,189,606 A * | 2/1993 | Burns et al. .................. | 705/7.23 |
| 6,446,053 B1 | 9/2002 | Elliott | |
| 6,584,414 B1 | 6/2003 | Green | |
| 6,801,814 B1 | 10/2004 | Wilson | |
| 6,859,768 B1 | 2/2005 | Wakelam et al. | |
| 6,965,855 B1 | 11/2005 | Burbridge et al. | |
| 7,089,203 B1 | 8/2006 | Crookshanks | |
| 2001/0039715 A1* | 11/2001 | Pommer et al. ................. | 29/564 |
| 2001/0047251 A1* | 11/2001 | Kemp ............................... | 703/1 |
| 2001/0052908 A1* | 12/2001 | Hartman ......................... | 345/630 |
| 2003/0050812 A1 | 3/2003 | Clark, III | |
| 2005/0228759 A1* | 10/2005 | King .............................. | 705/400 |
| 2006/0058923 A1* | 3/2006 | Kruk et al. ..................... | 700/275 |
| 2006/0085322 A1 | 4/2006 | Crookshanks | |
| 2006/0155634 A1 | 7/2006 | Woodard | |
| 2006/0173775 A1 | 8/2006 | Cullen, III | |
| 2006/0179012 A1 | 8/2006 | Jacobs | |
| 2006/0277007 A1 | 12/2006 | Wakelam | |
| 2007/0061774 A1 | 3/2007 | Chan | |
| 2007/0100775 A1 | 5/2007 | Vyas | |
| 2007/0208432 A1* | 9/2007 | Hawrysz ........................... | 700/1 |

FOREIGN PATENT DOCUMENTS

JP        2003-141178    *  5/2003

OTHER PUBLICATIONS

Salvage, Bryan, "Choosing the Right Flooring System," National Provisioner, Oct. 2005, pp. 112, 114, 116, 118, and 120.*
Ohm, Linda, "Switch to Outsourcing Pays Off," FDM, Jan. 2005, pp. 66, 68-71.*
Pleasant, Rachel, "Bowling Equipment Manufacturer Moves Into Lake Wales, Fla., Business Park," Knight Ridder Tribune Business News, Washington, Jul. 15, 2003, p. 1.*

(Continued)

*Primary Examiner* — Nathan Erb
(74) *Attorney, Agent, or Firm* — Gearhart Law, LLC

(57) ABSTRACT

The present invention discloses a methodology and device for predicting the cost of construction of a facility for use especially in conception stages of a project. The method proceeds by identifying a process application to be housed within the facility, identifying specified process equipment, minimum size of the facility, the support utility infrastructure required for all systems which will provide for the needs of the identified process application, and determining associated costs. A variety of other factors may also be examined in determining cost, and by identifying a project budget, the cost or budget itself may be adjusted.

6 Claims, 3 Drawing Sheets

OTHER PUBLICATIONS

Chen, J.H., and Jan, T.S., "A System Dynamics Model of the Semiconductor Industry Development in Taiwan," The Journal of the Operational Research Society, Oxford, Oct. 2005, vol. 56, Iss. 10, p. 1141.*

Pecaut, David, "The Key to Wealth Creation in Canada," CMA, Oct. 1995, pp. 11-14.*

Rathore, Anurag S., and Karpen, Matthew, "Economic Analysis as a Tool for Process Development: Harvest of a High Cell-Density Fermentation," Biopharm International, Nov. 2006, p. 56.*

Ulrich, Karl T., and Pearson, Scott, "Assessing the Importance of Design Through Product Archaeology," Management Science, Mar. 1998, pp. 352-369.*

* cited by examiner

METHOD OF DESIGNING AND BUILDING TO A TARGETED COST FOR HIGH TECH FACILITIES

CLAIM OF PRIORITY

This application claims priority to U.S. Ser. No. 61/072,149, filed Mar. 28, 2008, the contents of which are fully incorporated herein by reference.

BACKGROUND OF THE INVENTION

Free trade agreements, global manufacturing standards and the Internet have made it possible for companies to do business in countries they would not have considered twenty years ago. The world of opportunity is wide open, but for Research and Development (R&D) and Manufacturing of pharmaceuticals, semiconductors and other materials that must meet high standards of product purity and performance, the competition is stiffer than ever, as compliance with industry standards and government regulations forces companies large and small to play by the same rules. To better flex their muscles in the marketplace and pump up research and development, giant drugmakers are dismantling in-house manufacturing operations and moving production to places like China, India, Puerto Rico and Ireland, where they can take advantage of cheap land, low-cost labor, tax incentives or other perks.

The same goes for the nimble neophytes in emerging fields such as Biotechnology, biopharmaceuticals and nanotechnology; these R&D startups are outsourcing production and thus avoiding the prohibitive cost of owning and operating manufacturing facilities. A prerequisite for the manufacturing of novel products that may spend years in development pipelines is having technologically advanced manufacturing facilities.

To maintain cash flow—especially if there is no revenue base—these types of facilities must be delivered at the lowest possible cost. However, many companies, particularly those in the throes of startup and scaleup, lack experience in, or are unfamiliar with, the nuances of specifying high technology manufacturing facilities, and undertaking these projects using the traditional methods will not meet their requirements.

A methodology is needed to minimize the risk and maximize the return on investment for the delivery of high-technology facilities. Preferably, such a methodology should be applied early in the development process of a facility, such as during conception of the project, to reduce cost penalties involved in modifying a project once it is underway.

SUMMARY OF THE INVENTION

The invention provides a method for predicting the construction cost of a sophisticated or unsophisticated facility. The method comprises the steps of identifying either the R&D or Manufacturing process and all its associated process equipment to be housed within a facility, wherein based on the process equipment infrastructure utility requirements, footprint and the mechanical, plumbing, electrical and other related systems can be specified, identifying a minimum facility size based at least in part on the specifications of the process and infrastructure needs, and determining a cost to meet all parameters of compliance, quality and time to market objectives and calculating an overall project cost.

The method may also include the steps of identifying a project budget and comparing actual project costs to the project budget, and adjusting either the project budget or changing the design criteria to meet the project budget, if the project budget is not equal to or greater than the project cost. The method may also comprise an additional step of determining a cost of contracting at least part of the process to a third-party-owned facility and adjusting the minimum facility size accordingly. When adjusting the minimum facility size, the cost of implementing the process application may be redetermined.

The set of specifications for the process application must comprise of at least the cost of operations and cost of installation. The cost of the minimum facility size may also comprise costs associated with the building shell, aesthetic components, soft costs, professional service costs, and architectural/engineering costs.

DETAILED DESCRIPTION

Figure 1:
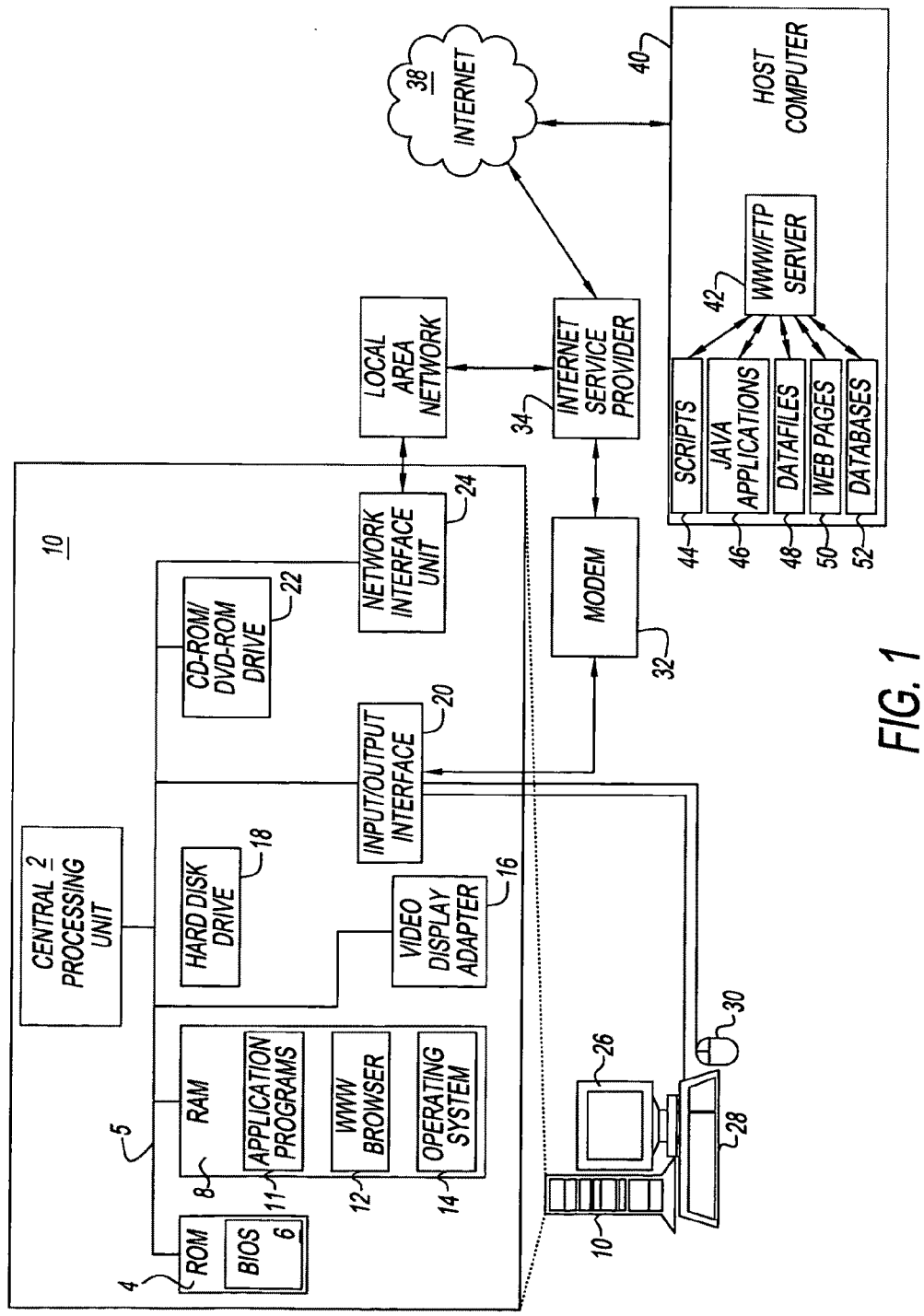
FIG. 1 shows a block diagram of a suitable computing environment in which the invention may be implemented.

FIG. 1 shows a block diagram of a suitable computing environment in which the invention may be implemented. Referring now to FIG. 1, an illustrative environment for implementing the invention includes a conventional personal computer 100, including a processing unit 102, a system memory, including read only memory (ROM) 104, a random access memory (RAM) 108, and a system bus 105 that couples the system memory to the processing unit 102. The read only memory (ROM) 104 includes a basic input/output system 106 (BIOS), containing the basic routines that help to transfer information between elements within the personal computer 100, such as during start-up. The personal computer 100 further includes a hard disk drive 118 and an optical disk drive 122, e.g., for reading a CD-ROM disk or DVD disk, or to read from or write to other optical media. The drives and their associated computer-readable media provide nonvolatile storage for the personal computer 100. Although the description of computer-readable media above refers to a hard disk, a removable magnetic disk and a CD-ROM or DVD-ROM disk, it should be appreciated by those skilled in the art that other types of media readable by a computer, such as magnetic cassettes, flash memory cards, digital video disks, Bernoulli cartridges, and the like, may also be used in the illustrative operating environment.

A number of program modules may be stored in the drives and RAM 108, including an operating system 114 and one or more application programs 110, for instance a program for browsing the world-wide-web, such as WWW browser 112. Such program modules may be stored on hard disk drive 118 and loaded into RAM 108 either partially or fully for execution.

A user may enter commands and information into the personal computer 100 through a keyboard 128 or pointing device, such as a mouse 130. Other control input devices (not shown) may include a microphone, joystick, game pad, satellite dish, scanner, or the like. These and other input devices are often connected to the processing unit 100 through an input/output interface 120 that is coupled to the system bus, but may be connected by other interfaces, such as a game port, universal serial bus, or firewire port. A display monitor 126 or other type of display device is also connected to the system bus 105 via an interface, such as a video display adapter 116. In addition to the monitor, personal computers typically include other peripheral output devices (not shown), such as speakers or printers. The personal computer 100 may be capable of displaying a graphical user interface on monitor 126.

The personal computer 100 may operate in a networked environment using logical connections to one or more remote computers, such as a server or host computer 140. The host computer 140 may be a server, a router, a peer device, or other common network node, and typically includes many or all of the elements described relative to the personal computer 100. The LAN 136 may be further connected to an Internet service provider 134 ("ISP") for access to the Internet 138. In this manner, WWW browser 112 may connect to host computer 140 through LAN 136, ISP 134, and the Internet 138. Such networking environments are commonplace in offices, enterprise-wide computer networks, intranets and the Internet.

When used in a LAN networking environment, the personal computer 100 is connected to the LAN 136 through a network interface unit 124. When used in a WAN networking environment, the personal computer 100 typically includes a modem 132 or other means for establishing communications through the Internet service provider 134 to the Internet. The modem 132, which may be internal or external, is connected to the system bus 105 via the input/output interface 120. It will be appreciated that the network connections shown are illustrative and that other means of establishing a communications link between the computers may be used.

The operating system 114 generally controls the operation of the previously discussed personal computer 100, including input/output operations. In the illustrative operating environment, the invention is used in conjunction with Microsoft Corporation's "Windows Vista" operating system and a WWW browser 112, such as Microsoft Corporation's Internet Explorer or Mozilla Corporation's Firefox. However, it should be understood that the invention can be implemented for use with other operating systems, such as "WINDOWS XP," "MacOS," "Linux," "Ubuntu," "PalmOS," "OS/2," "SOLARIS" and the like. Likewise, the invention may be implemented for use with other WWW browsers known to those skilled in the art.

Host computer 140 is also connected to the Internet 138, and may contain components similar to those contained in personal computer 100 described above. Additionally, host computer 140 may execute an application program for receiving requests for WWW pages, and for serving such pages to the requester, such as WWW server 142. According to an embodiment of the present invention, WWW server 142 may receive requests for WWW pages 150 or other documents from WWW browser 112. In response to these requests, WWW server 142 may transmit WWW pages 150 comprising hyper-text markup language ("HTML") or other markup language files, such as active server pages, to WWW browser 112. Likewise, WWW server 142 may also transmit requested data files 148, such as graphical images or text information, to WWW browser 112. WWW server may also execute scripts 144, such as PHP, CGI or PERL scripts, to dynamically produce WWW pages 150 for transmission to WWW browser 112. WWW server 142 may also transmit scripts 144, such as a script written in JavaScript, to WWW browser 112 for execution. Similarly, WWW server 142 may transmit programs written in the Java programming language, developed by Sun Microsystems, Inc., to WWW browser 112 for execution. As will be described in more detail below, aspects of the present invention may be embodied in application programs executed by host computer 142, such as scripts 144, or may be embodied in application programs executed by computer 100, such as Java applications 146. Those skilled in the art will appreciate that aspects of the invention may also be embodied in a stand-alone application program.

Figure 2:
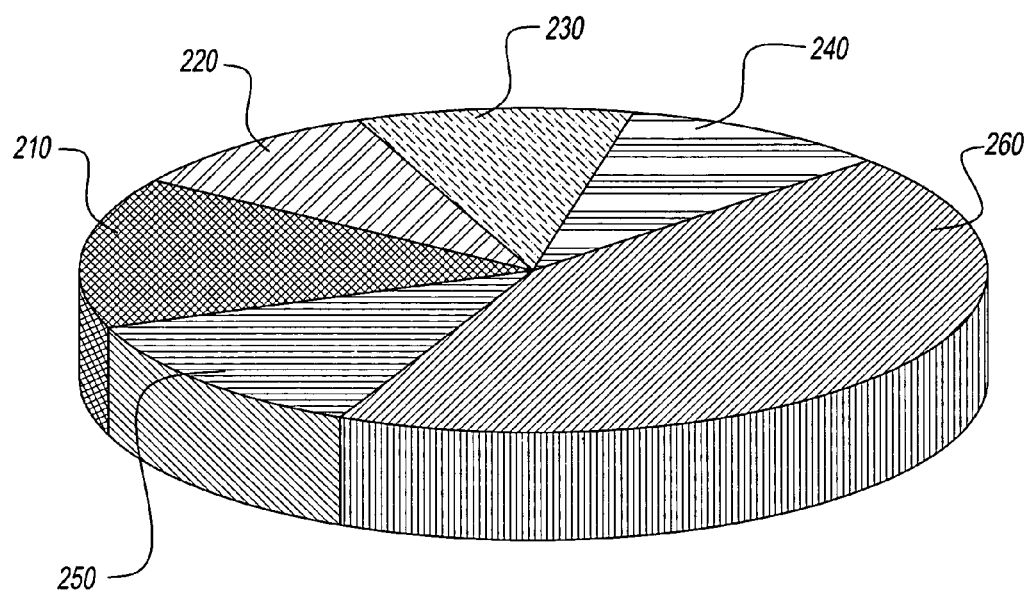
FIG. 2 is a chart of the breakdown of the typical areas of project costs associated with designing and constructing a facility to support a particular process.

FIG. 2 is a chart of an overview of typical project costs associated with designing and constructing a facility to support a particular process application, excluding costs associated with purchasing the process equipment. As used herein, "process application" is defined as a set of steps utilizing specialized equipment, materials and ingredients/components over a specified timeframe engineered to a specified performance criteria in order to yield a final result or product. Costs of the process equipment/systems 260 normally range from 40% or 60% of the overall project cost, depending on the specific facility. In Pharmaceutical facilities there are several process applications such as Oral Solid Dosage Manufacturing, Sterile Manufacturing, Aceptic Filling, Packaging and Research and Development. In Semiconductor facilities there are many process applications such as Device Manufacturing, PhotoVoltaic Manufacturing, Foundries, NanoTechnology and MEM's Manufacturing. In Biotechnology facilities there are process applications such as Cell Culture Manufacturing, Fermentation, Vaccines, Therapeutics, Genomics, Bioinformatics and Drug Discovery operations. In Medical Device facilities there are many process applications such as InVitro Diagnostics, Injection Molding, Implantable device manufacturing and Orthopedic Device Manufacturing. The skilled artisan will appreciate that this is a non-limiting list of process applications. The invention has to be customized to evaluate each process application. Although, regardless of market sector and process application the approach and and controlled steps taken to thoroughly assess the process application and predict its cost of implementation are methodical in any case described above.

The building shell 210, is typically 12% to 15% of the total project cost. The building shell is the envelope that houses the processes and machinery as used in the invention, comprises slab, structure, exterior walls, roof, limited utility systems such as those required by building code, and the like. The cost of this component may vary due to aesthetic and structural concerns such as the type of building facade, architecture of the building, structural integrity, location, height, utility infrastructure requirements, and attractive architectural features. Projected cost of the building shell typically varies from $0 to $90 per square foot. When cost of the building shell is $0, typically this is due to a tenant leasing a building at zero cost and paying a percentage of profits to a developer, or another similar arrangement.

Soft costs, 220, are typically about 12% to 15% of the total project cost and include costs associated with design, engineering, commissioning and validation services. which can vary based on the complexity of the systems installed, documentation, and testing. Included in this cost are fees for professional services, such as professional architectural, mechanical, electrical, process, plumbing, design and engineering. Soft costs 220 also include costs of commissioning and validation services. Commissioning and validation is the effort required toward the end of construction to prove that all critical and non-critical systems are installed and perform to specifications, as determined by the initial design and engineering documentation and criteria. The commissioning and validation components is equivalent to 5% of the overall project cost. Variance is a function of the complexity of the system, having proper documentation outlined and requested at the time of bidding to vendors and subcontractors, the amount of factory acceptance testing versus field testing, and the timing of completion of construction.

Electrical costs, 230, are typically 9% to 12% of total project costs and are typically consistent or predictable factors in the cost of a project. Electrical requirements are largely regulated by national codes which lead to consistent approaches in designing these systems. Typical factors taken into account when factoring in electrical costs 230 include requirements for emergency power, uninterruptible power supply, redundant substation service with a static switch, lighting, lightning protection, grounding, power voltages, and means of distribution and security. Cost variance for electrical systems 230 typically may be up to about $45 per square foot.

Construction management and general conditions 240 are typically 8% to 11% of total project costs associated with managing all construction activities by a general contractor or construction management firm. This cost also includes costs for temporary office space, which includes costs for equipment and utilities for all related construction-management personnel. The costs associated with all general conditions can vary from about 5% to 10% of overall project cost and is based at least in part on the duration of the project, phasing strategy, project complexity, weather conditions, and utilization of overtime for expediting a project. Construction management fees can vary from between about 1% to 5% of the total project cost, based on a risk profile for the project and form of contract (lump-sum vs. time and material contract vs Guaranteed Maximum Price ($GMP) and the related terms and conditions such as liquidated-consequential damages clauses, etc.).

Architectural costs 250 are typically 10% to 15% of total project costs and are costs associated with choices of architectural finishes. Often it is desired to have smooth, cleanable surfaces which do not compromise products being produced. Typical variations in cost of architecture comprise costs of walls, floors and ceilings selected for the facility, which can have a total possible cost variance of $80 per square foot, depending on the material selected and the labor required for installation. These selections are also based on the cleanliness classification levels outlined for the facility, and the allowances made for net-to-gross footage allocations. For example, certain room finishes may assure, or add to, the desired ambiance for workers and improve product quality. In some cases, walls made of honey-combed metal may be preferred, while in clean rooms epoxy-painted drywall may be desirable. While facilities that use more expensive finishes will incur a higher capital-investment cost than those that employ a lower-cost strategy, the function or purpose of the facilities may be identical.

The mechanical/process utility costs, 260, are typically 40% to 50% of project cost and is typically the most expensive cost of producing a facility and, in turn, the single largest cause of project cost variances. Mechanical and process utility systems are critical to product quality and plant capacity. An improperly designed air or water system can easily lead to product failures. The combinations of equipment and system choices, such as those of air and water systems and other systems within a facility, are numerous. A design approach for mechanical systems can cause an overall cost variance of up to $320 per square foot with regard to exhaust and makeup air systems, room air classifications, redundancy of critical systems, energy-efficient systems versus lowest first-cost systems, number of control zones, type of ductwork and insulation, terminal high-efficiency particulate air (HEPA) filters versus central HEPA in heating, ventilation and air-conditioning units, central plant systems versus localized systems that support each area, specification of larger-size equipment in anticipation of future build out, control criteria for temperature, humidity specifications, and central building automation control versus localized control with monitoring capability. Still further systems which cause variations in mechanical and process systems are process cooling and heating systems, high-purity water systems, bulk- and specialty-gas purity requirements, chemical distribution and collection systems, waste treatment systems, process vacuum systems, scrubber technology, extent of process automation, isolation technology, cleaning-place systems versus manual cleaning, clean steam systems, and safety alarms and detection devices.

Figure 3:
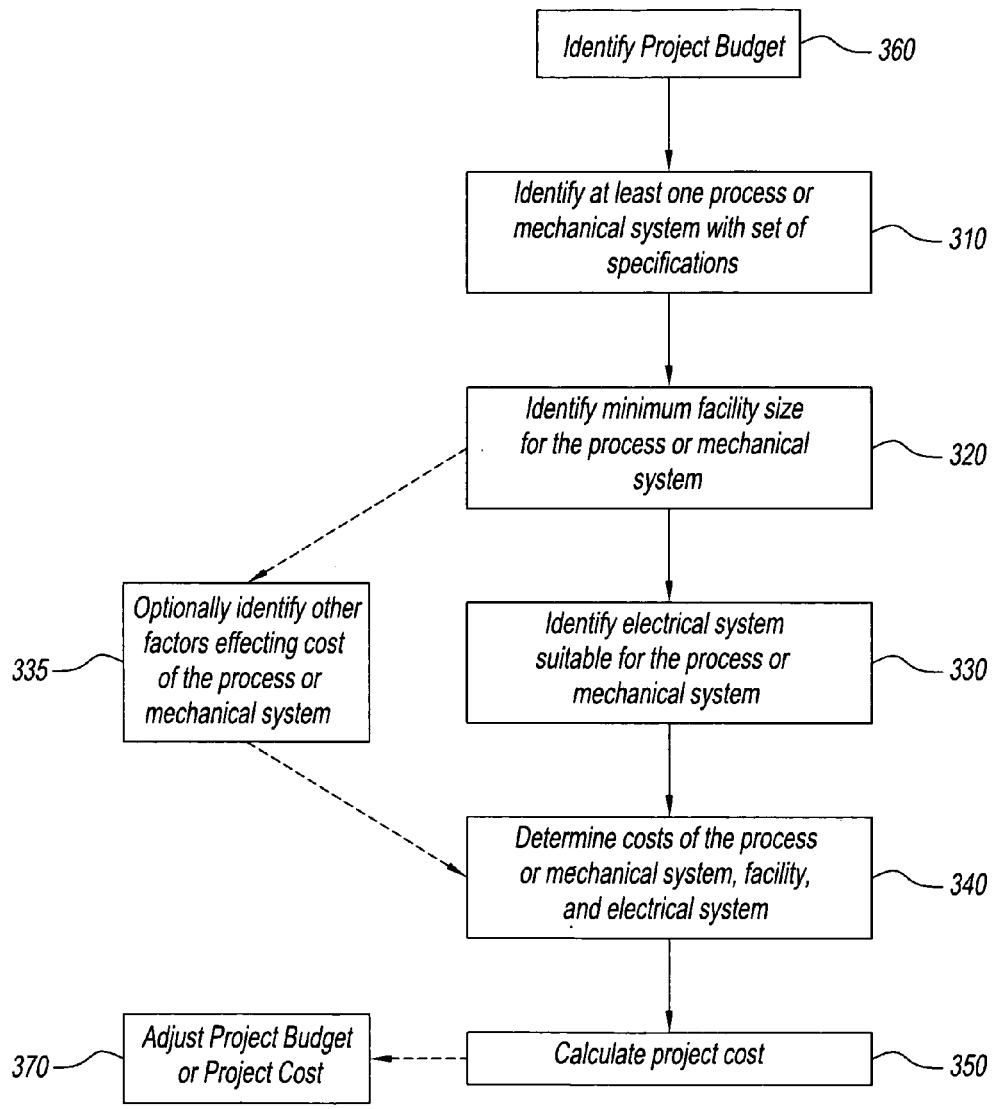
FIG. 3 is a flow chart of a method of carrying out embodiments of the invention.

FIG. 3 shows a flow chart of a method of carrying out embodiments of the invention. Once the process application with a set of the required process equipment is identified, the steps of the method must serve to allow the process or mechanical system to function as intended within a facility. It should also be understood by one having ordinary skill in the art, that it is contemplated and within the scope of the invention for a plurality of processes to be identified in step 310, and that the method of the invention proceeds in substantially the same manner. Identifying such a plurality of processes and carrying out the method of the invention in such a manner may be desired because the cost and space requirements may be more efficient than addressing each step of the process individually. A process may be any process used in a facility and varies depending on the type of facility. Examples of facilities and processes have been described above with respect to FIG. 2.

In step 320, for at least one identified process or mechanical system, a minimum facility size is identified. The minimum facility size is the smallest footprint or square footage that may be used which will afford enough space to carry out an identified process in a safe, efficient and complaint manner. The size of the facility is a factor in the cost of construction of the facility.

In step 330 a architectural, mechanical, process and electrical systems suitable for the identified process and related process equipment are identified. Collectively, these processes can be referred to as "design criteria". As defined herein "design criteria" is a set of performance parameters for all building systems that are required to support the process application. The performance parameters include the type, size, capacity, materials of construction and controls. Such an electrical system may be known in the art and may be a system of providing electricity to power the machinery and equipment used in conjunction with, or necessary to, carry out the identified process and/or power the identified infrastructure support systems.

In step 335, an optional step of identifying other factors affecting cost of constructing the identified process application are identified. These may be costs associated with procurement, purchase, installation, maintenance, upkeep, and the like. In this step, costs may also be adjusted based on risk tolerance of the company which will use the facility. For example, the approach to designing the facilities of a company with an operation running from 8:00 a.m. to 5:00 p.m. five days a week, will be quite different from that of a company with 24-hour operations, seven days a week, The 24/7 facility will purchase equipment with higher specification requirements with redundant equipment/systems to ensure uptime. Also, the amount and type of automation and control systems required in the 24/7 facility will be more robust and extensive. There is substantial cost associated with reducing operational risks, and there are financial and philosophical decisions customized to each company.

In another example of identifying cost in step 335, adjustments to cost may be made based on system performance criteria and installation costs vs. maintenance costs. If a company has a business horizon of three to five years for its technology, then the decision is easier than that for a company with a ten-year horizon. An example of this type of decision-making is whether to use individual outdoor direct expansion (DX) air-cooled conditioning units for all areas, or to use an indoor central water-cooled chiller system with outdoor cooling towers to provide the same quality and temperature of air to all spaces. The difference is the operating cost associated with each of these two approaches. The DX approach uses twice the electrical power of the water-cooled solution. The cost to furnish and install the water cooled system is about 1.5 times that of the DX system.

In yet another example of identifying cost in step 335, a cost of building a facility made for handling contracted work from third parties, contracting work out to third parties, or producing products in a company's own facility may be factored into the costs. The approach to designing a contract facility is different from that used by a company that makes its own products. A contract facility has client influences that impact costs such as: facility flexibility to handle multiple products with different capacities, design aesthetics to attract and impress prospective customers, documented proof that the facility performs to client requirements, ensures product integrity throughout processing and protects against cross-contamination from other products.

Still further, costs identified in step 335 may comprise any of the costs described with reference to FIG. 1, including costs of the building shell 210, soft costs 220, electrical costs 230, construction management and general conditions 240, architectural costs 250, and mechanical/process costs 260.

In step 340, information garnered in any of the above-described steps of FIG. 3, and typically in the combination of steps 310, 320, and 330 (and sometimes step 335) is used to determine costs of the process or mechanical system as well as costs of procurement or construction of the facility. Step 340 may also include determination of costs of the electrical system and other systems associated with the identified process application of step 310.

In step 350, based on the determined costs of step 340, an estimated total cost of the project is generated. In some embodiments of the method of the invention, a project budget is identified in step 360, and in step 370 the project budget or the project costs may be adjusted as necessary. Step 370 will be carried out if, for example, the project budget is less than the estimated cost or if the project cost is greater than the project budget. To adjust the project cost, less or more expensive equipment, labor, processes, or machinery may be used.

The above is a general description of embodiments of the invention. However, examples in the above disclosure are illustrative of the invention and not intended to limit the scope of the invention. Other embodiments are contemplated which are both within the scope and spirit of the application.

I claim:

1. A method of predicting the construction cost of a facility comprising the steps of:
    first, identifying at least one process application to be housed within a facility, wherein said process application has a set of specifications;
    second, identifying a minimum facility size based at least in part on the specifications of the process application;
    third, identifying the required architectural, mechanical and process, and electrical systems suitable to support the process application for the facility based at least in part on the specifications of said process application thereby creating a design criteria, wherein
        the architectural system comprises walls, floors, ceilings, shells, and room finishes selected for the facility,
        the mechanical and process system comprises air systems, water system, energy control systems, design services, engineering services, commissioning services, validation services, operation and management of the facility, and
        the electrical system comprises a system providing electricity to power and support the process application;
    determining a risk tolerance of a company using the facility;
    comparing installation costs of the process application and maintenance costs of the process application;
    determining whether the facility is made for handling contracted work from third parties, contracting work out to third parties, or producing products in the company building the facility;
    determining a cost of the process application, and the cost of the architectural, mechanical and process, and electrical systems, and calculating, by a computer system, a project cost;
    adjusting the project cost according to the risk tolerance;
    adjusting the project cost according to the comparison between the installation costs and the maintenance costs;
    adjusting the project cost according to the decision as to whether the facility is made for handling contracted work from third parties, contracting work out to third parties, or producing products in the company building the facility;
    identifying a project budget; and
    comparing said project cost to said project budget, determining said project budget is less than said project cost, and adjusting either said project budget or the design criteria of the project.

2. The method of claim 1, comprising the additional step of:
    determining a cost of contracting at least one part of the process to a third-party-owned facility and adjusting said minimum facility size based on said contracting.

3. The method of claim 2, wherein upon adjusting said minimum facility size said cost of said revised process application is redetermined.

4. The method of claim 1, wherein said set of specifications for said process application comprises at least a cost of operation and a cost of installation of said process application.

5. The method of claim 4, wherein said cost of operation comprises costs of projected professional services associated with operation of said process application.

6. The method of claim 4, wherein said cost of installation comprises costs of projected professional services associated with installation of said process application.

* * * * *